Dec. 16, 1969   E. J. NELSON   3,483,982
FILTER SYSTEM FOR DEEP FAT FRYER
Filed Oct. 3, 1967   2 Sheets-Sheet 1

INVENTOR:
EDWARD J. NELSON

ATTORNEY

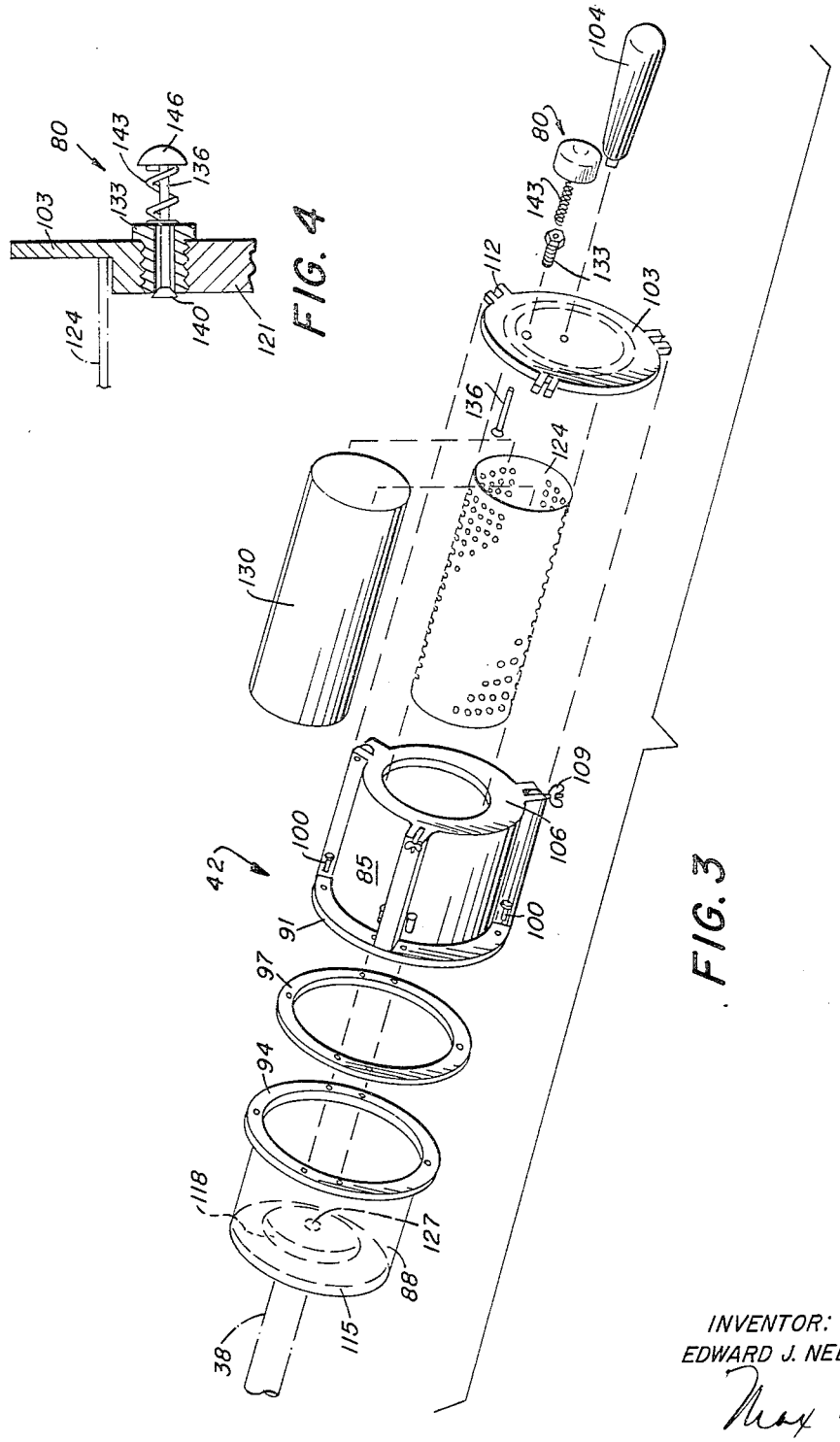

United States Patent Office 3,483,982
Patented Dec. 16, 1969

3,483,982
FILTER SYSTEM FOR DEEP FAT FRYER
Edward J. Nelson, Omaha, Nebr., assignor to Ballantyne Instruments and Electronics, Inc., Omaha, Nebr., a corporation of Delaware
Filed Oct. 3, 1967, Ser. No. 672,628
Int. Cl. B01d 29/00
U.S. Cl. 210—167                                  5 Claims

ABSTRACT OF THE DISCLOSURE

Cooking apparatus systems and in particular apparatus which comprises a deep fat fryer which is electrically heated and which has a filter system for filtering the cooking oil. A particular feature of the invention resides in providing a system wherein the cooking fat or oil is continuously filtered during a cooking cycle while the cooking vessel is under pressure. Another important feature of the invention resides in a system comprising a filter wherein, when filter maintenance is required due to the filter element being clogged, a signal is automatically energized to apprise an operator of the filter condition.

---

It has been found that continuous filtering of cooking oil produces distinct advantages of an inobvious nature in that the coater from food products, collected by the oil, is immediately removed from the oil thereby preventing carbonization of the coater in the oil and eliminating oil breakdown. Experiments show that such coater removal by continuous filtering during a cooking cycle substantially doubles oil life under practical operating conditions. As a result, oil is replenished from time to time but rarely replaced, thereby effecting a considerable economy in time and materials. A further advantage resides in the fact that the interior of the cooking container and the elements therein, such as the stainless steel basket, require virtually no scouring and cleaning over very long periods of time, far longer than is required with ordinary systems. An additional and very important advantage has been found to be a maintenance of constant temperature of the cooking oil by virtue of the continuous flow. This produces a more even cooking of the food product due to the flowing of hot oil around it at all times.

The above advantages are of particular note where the cooking apparatus comprise a closed pressure system since foreign material is no longer present to clog the valves of the cooking container when pressure is released at the end of a cooking cycle.

A still further advantage resides in the fact that the cooking operation can continue even while the filter material in the filter system is being changed, by suitable valving of the apparatus.

The use of an automatically operative signal such as a buzzer to apprise an operator that the filter element requires changing eliminates system breakdowns and insures proper operation.

Briefly, the invention is for a system comprising a cooking container such as a deep fat fryer which may be of the pressure or non-pressure type in combination with an electrically operative pump and a filter device. In a pressure type system, an electrically controlled exhaust valve is included to exhaust the pressure in the cooking kettle when the cooking cycle has been completed. These elements are connected for fluid flow and controlled by a timing device of any conventional nature such that in a pressure system the electrical exhaust valve (not shown) for the cooking container and the electric motor of the pump are simultaneously energized for the cooking cycle. Accordingly, a continuous cooking oil circulation is maintained during the cooking cycle.

The filter device itself is believed to be of improved construction in that it comprises a cylindrical housing having a cylindrical foraminous filter holder therein which constitutes a support for a filter element such as a cylinder or sleeve of filter paper or filter cloth. Such cylinder of filter element may be within the foraminous cylinder for support therein or readily removed therefrom for replacement.

The construction is such that inlet flow to the filter housing is coaxial with the filter element.

By providing a vacuum responsive switch in the conduit connection between the filter housing and the pump inlet, which switch is responsive to a drop in pressure in that conduit, energization of a buzzer or other signal means is automatically responsive to such pressure drop. The pressure drop is caused by clogging of the filter element since there is then a substantially reduced flow to the pump inlet and accordingly the pump tends to evacuate the conduit connection and the filter housing. The signal apprises an operator of the clogged condition of the filter device. By manipulation of suitable valving he may then shut off flow from the cooking container to the filter housing and proceed to clear and dry the filter housing by maintaining the filter pump energized and by opening an air inlet into the filter housing so that it can become thoroughly dry. Subsequently, the filter housing is readily disassembled to the extent of removing the cover thereof and a new cylinder of filter material is substituted for the one which has become unusable.

A detailed description of the invention now follows in conjunction with the appended drawings in which:

FIGURE 3 is an exploded perspective view of the filter device and

FIGURE 4 is a magnified fragmentary cross-section of a portion of the filter device showing assembly of the cover and the air inlet valve.

Figure 1:
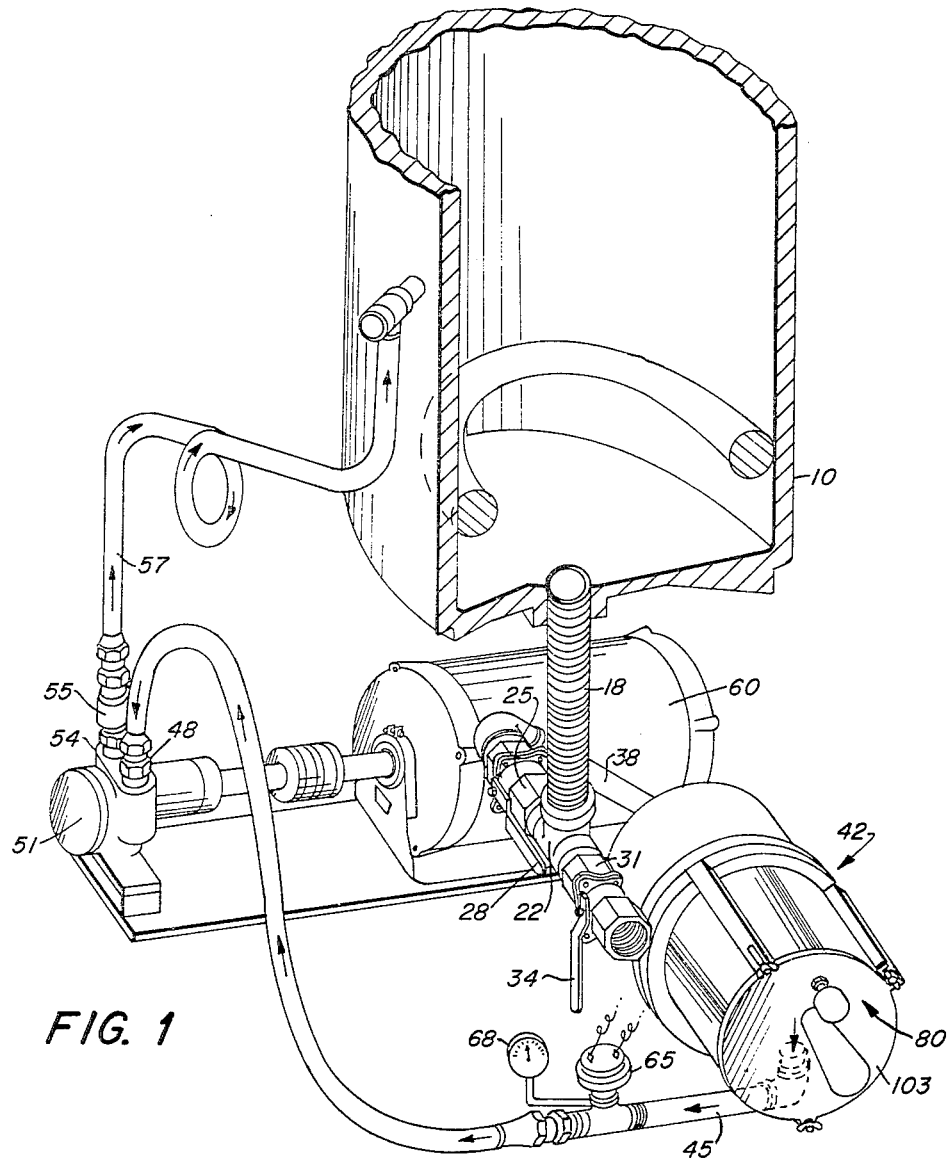
FIGURE 1 is a perspective of the entire system in its eseentials as it pertains to the present invention.
Figure 2:
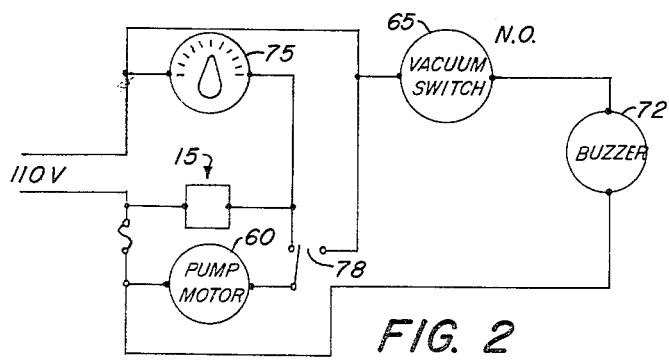
FIGURE 2 is a schematic diagram of the essential circuitry pertaining to the invention disclosed.

Referring to FIGURES 1 and 2, the invention comprises a cooking container 10 which may be a commercial type deep fat fryer of either open or closed construction for non-pressure or pressure use and having an exhaust solenoid valve unit 15, all of conventional construction and well known in this field. A conduit 18 threadedly connects at the bottom of the container and communicates with a T-fitting 22 as shown. The T-fitting connects at one end with a conventional valved coupling 25 having a manually operable valve (not shown) with the manual control lever 28.

A fluid flow conduit 38 connects the downstream end of coupling 25 with the interior of the housing of a filter device 42. The downstream end of the filter device connects with a fluid flow conduit 45 to the inlet 48 of an electrically operated pump 51, the outlet 54 of which communicates through a check valve 55 and with a fluid flow conduit 57 leading to an upper portion of the cooking container 10. Pump 51 is driven by an electric motor 60.

From the foregoing description it will be apparent that motor 60, when energized, will maintain a continuous circulation of hot cooking oil through the filter device 42.

Upstream of the pump inlet, and as a matter of convenience in flow communication with conduit 45, a pressure responsive means 65 is connected. If desired, a pressure gauge 68 may be coupled thereto or anywhere in the line although it is not essential to the operation of the invention.

The pressure responsive means 65 is, in this instance, a conventional vacuum responsive electric switch so that in the event of a drop in pressure in the conduit 45 the switch contacts (not shown) are closed to energize the signal means, such as a buzzer 72, shown in the circuit diagram of FIGURE 2. Thus in the event of failure of cooking oil to flow through the filter device due to clogging of the filter by particles collected from the cooking oil the suction effect of the pump is increased in the conduit 45 sufficiently to actuate the switch 65. Referring to FIGURE 2, the fundamental wiring arrangement provides a power source of 110 volts and it will be understood that closure of the normally open switch 65 effects energization of buzzer 72 which is in series with the switch and the power line. Further, it will be noted that as long as switch 65 is closed, the buzzer remains operative.

Cooking apparatus systems normally comprise manually settable timing switches such as the switch 75 shown in FIGURE 2 which time the cooking cycle. In the arrangement of the present invention the pump motor 60 is in parallel with the solenoid exhaust valve (not shown) thus insuring operation of the pump for the predetermined length of time of the cooking cycle as controlled by the timing device 75. However, a jumper switch 78 is provided so that the pump motor may be kept operative independently of control of the timing device 75. This is desirable in the event that work is to be done on the filter device and its system independently of the remainder of the apparatus.

From the above description it will be apparent that the valve handle 28 is normally in the open position to permit continuous circulation and remains in that position. The cooking cycle is determined by the setting of the timing device 75. Should it be desired to drain the cooking container, valve handle 28 is swung to close the valve of coupling 25 and valve handle 34 is swung to open the valved coupling 31 whereby draining of cooking oil may be had through the open end of that coupling into a container or the like (not shown).

In the event that the filter device 42 becomes clogged, an operator hearing the buzzer 72 merely closes the handle 28 on coupling 25 which stops the flow of oil. He then presses an air inlet valve 80 (to be subsequently described) whence any cooking oil in the filter housing will be drawn out since flow is permitted by virtue of air entry into the housing. The air flow entrains any oil residue in the housing. Thus, the housing is cleared of residual oil as well as being dried by the air flow therein. At that time the filter element may be changed in a manner to be described, it being noted that if it is not desirable to do this during a cooking cycle, the switch 78 may be thrown to independently energize the pump motor 60 directly from the power line.

Referring now to FIGURES 3 and 4, the filter device 42 will be seen to comprise a main cylinder 85 and an end cylinder 88, said cylinders having opposed integral flanges 91 and 94, respectively, which upon assembly clamp therebetween a sealing gasket 97, such assembly being secured as by screws 100. A cover 103 having a handle 104 closes the outer end 106 of the housing cylinder 85 and may be readily clamped thereto by the pivotal wing bolts 109 in a well known manner engaging the yokes 112 of the cover. The end closure wall 115 of end cylinder 88 carries boss 118 and the cover 103 carries a similar boss 121 (FIGURE 4). The bosses are of a diameter commensurate with the internal diameter of a tubular member 124 which is a filter holder of a foraminous metallic material. Upon assembly, the holder is securely held by the bosses centered within the interior of the housing coaxially therewith and coaxial with the bore 127 through the end wall 115 which bore will be understood to connect to the conduit 38 of FIGURE 1.

A cylinder or sleeve 130 of filter paper or filter cloth, forming a tubular filter element, is carried within the interior of holder 124 and it will be appreciated that such filter member may be readily slid out of the holder when cover 103 is removed and a new element slid in. The conduit connection 45 leading from the filter housing has been eliminated for clarity in FIGURE 3 but will be understood to be present adjacent the cover, as indicated in FIGURE 1.

Carried by the cover is the air inlet valve 80 shown in detail in FIGURE 4, comprising a threaded bushing 133 carrying a slidable valve stem 136 having the valve head 140 which coacts with a valve seat at the end of the bushing. A spring 143 maintains the valve closed and the end of the valve stem has a manually depressable button 146 which can be pressed by an operator to open the valve to admit air into the filter housing.

From the above description it will be apparent that upon sounding of the buzzer the operator may, during a cooking cycle, press button 146 to admit air to the filter housing after first closing the valve in coupling 25 thereby isolating the filter device from the remainder of the system except for the connection to the pump inlet. After holding the air inlet button open for a period of time determined by experience and depending upon the size of the filter device, the operator may release the button and unloosen the fastening elements 109 to remove the cover 103 which is readily manipulated by the attached handle.

Thereupon the filter element 130 is replaced, the cover 103 reassembled, the valve in coupling 25 reopened and the system is ready for continuous cooking oil circulation. Such change of filter element is normally but a short fraction of a cooking cycle with the disclosed apparatus, and during the replacement operation the buzzer 72 will remain energized, it being understood that the pressure response setting of switch 65 is such that oil must be flowing in conduit 45 in order to maintain the switch contacts open, i.e., mere air flow in conduit 45 will not have sufficient line pressure to open switch 65. When cooking oil once more properly circulates, the buzzer will be silenced due to opening of switch 65.

It will be apparent that a relatively simple system using many commercially obtainable parts can effect the purposes and objects of the invention and achieve the improved results described.

What is claimed is:

1. A filter device for cooking apparatus using a cooking medium which circulates in a closed system between the cooking vessel and the filter device, and which device comprises a housing having a pair of end members for closing said housing, each end member having a centrally disposed boss of reduced diameter for supporting a foraminous filter holder thereon, a filter means supported by said holder, means for securing said end members in sealing relation to said housing with the filter means disposed between them in spaced relation to said housing, and an air venting means for said housing disposed in the wall of one of said end members above said filter means, said venting means comprising a spring pressed valve operable upon pressure applied thereto to admit air to said housing, and closable upon release of said pressure to shut off such air.

2. A device for filtering a cooking medium in a circulating cooking system comprising a cooking vessel, a filter means, pump means for continuously circulating said cooking medium from said vessel through said filter means in a closed circuit, valve means in the system between said vessel and said filter means for closing communication between said vessel and filter means, a housing having a pair of end closure members for closing said housing, each end member having a centrally disposed annular boss of reduced diameter for supporting a foraminous filter holder thereon, a filter means supported by said holder, means for securing said end members in sealing relation to said housing with the filter means disposed between them and with the periphery thereof in spaced relation to said housing, one of said end closure members having an inlet opening in said boss to direct said circulating cooking medium into the filter means, an outlet opening in said housing below said filter means connected to said pump, and an air vent above said filter means whereby upon the clogging of said filter element with particles from the cooking medium, and after the closing of said valve, said vent may be opened to admit air to the system so that the suction of the pump may exhaust all the cooking medium from the filter means and housing, and the filter means may be replaced without stopping the cooking process.

3. A device according to claim 2 in which the air vent comprises a normally closed spring pressed valve.

4. A device according to claim 2 in which said air vent is disposed in one of said closure members and comprises a bushing having a valve seat, and a valve head member yieldingly urged to normally close against said seat, whereby pressure against said valve head admits air to the filter housing.

5. A device as set forth in claim 2, including a pressure responsive switch actuatable by a change in pressure in said system, and connected in said system for detecting pressure change in response to clogging of said filter device, and a signal means energizable by actuation of said pressure responsive switch.

References Cited
UNITED STATES PATENTS

| | | | |
|---|---|---|---|
| 1,231,477 | 6/1917 | Bibb | 210—436 |
| 2,157,668 | 5/1939 | Kidd | 210—436 X |
| 3,280,722 | 10/1966 | Rahauser | 99—408 X |
| 3,356,218 | 12/1967 | Grudoski | 210—167 |

REUBEN FRIEDMAN, Primary Examiner

T. A. SPANGER, Assistant Examiner

U.S. Cl. X.R.

99—408; 210—436